United States Patent [19]
Lee

[11] Patent Number: 6,070,249
[45] Date of Patent: May 30, 2000

[54] SPLIT PARITY SPARE DISK ACHIEVING METHOD IN RAID SUBSYSTEM

[75] Inventor: Hae-Seung Lee, Kyungki-do, Rep. of Korea

[73] Assignee: SamSung Electronics Co., Ltd., Suwon, Rep. of Korea

[21] Appl. No.: 08/935,201

[22] Filed: Sep. 22, 1997

[30] Foreign Application Priority Data

Sep. 21, 1996 [KR] Rep. of Korea ........................ 96-41479

[51] Int. Cl.$^7$ ...................................................... G06F 11/16
[52] U.S. Cl. ................................................ 714/6; 711/114
[58] Field of Search ................................. 714/6, 7, 766, 714/805; 711/114

[56] References Cited

U.S. PATENT DOCUMENTS

| | | | |
|---|---|---|---|
| 5,130,992 | 7/1992 | Frey, Jr. et al. | 714/805 |
| 5,258,984 | 11/1993 | Menon et al. | 714/710 |
| 5,331,646 | 7/1994 | Krueger et al. | 714/6 |
| 5,388,108 | 2/1995 | DeMoss et al. | 714/710 |
| 5,488,701 | 1/1996 | Brady et al. | 714/6 |
| 5,530,948 | 6/1996 | Islam | 714/6 |
| 5,533,190 | 7/1996 | Binford et al. | 714/6 |
| 5,872,906 | 2/1999 | Morita et al. | 714/6 |

FOREIGN PATENT DOCUMENTS 43 92 143 C1 11/1996 Germany.

OTHER PUBLICATIONS

Lee et al "Double parity sparing for performance improvement in disk arrays" IEEE Conference Proceedings p. 169–174, Jun. 1996.

Chandy et al, "Failure evaluation of disk array organizations" Distributed Computing Systems, 1993., Proceedings the 13th International Conference, p. 319–326, Jun. 1993.

*Primary Examiner*—Robert W. Beausoliel, Jr.
*Assistant Examiner*—Christopher Revak
*Attorney, Agent, or Firm*—Robert E. Bushnell, Esq.

[57] ABSTRACT

A split parity spare disk achieving method for improving the defect endurance and performance of a RAID subsystem which distributively stores data in a disk array consisting of a plurality of disk drives and carries out an input/output operation in parallel includes the steps of: constructing the disk array with at least two data disk drives for storing data, a spare disk drive used when a disk drive fails and a parity disk drive for storing parity data; and splitting the parity data of the parity disk drive and storing the split data in the parity disk drive and the spare disk drive.

10 Claims, 17 Drawing Sheets

|    | S1 | S2 | S3 | S4 | S5 |
|---|---|---|---|---|---|
| FIRST BIT DATA | ① | 1 | 0 | 1 | 1 |
| SECOND BIT DATA | 1 | ⓪ | 0 | 1 | 0 |
| THIRD BIT DATA | 0 | 1 | ⓪ | 0 | 1 |
| FOURTH BIT DATA | 1 | 1 | 1 | ① | 0 |
| FIFTH BIT DATA | 0 | 0 | 0 | 1 | ① |

| SP |   |   |   |   |   |
|---|---|---|---|---|---|

Fig. 4

SPLIT PARITY SPARE DISK ACHIEVING METHOD IN RAID SUBSYSTEM

CLAIM OF PRIORITY

This application makes reference to, incorporates the same herein, and claims all benefits accruing under 35 U.S.C §119 from an application entitled Split Parity Spare Disk Achieving Method In A RAID Subsystem earlier filed in the Korean Industrial Property Office on Sep. 21, 1996, and there duly assigned Serial No. 96-41479 by that Office.

BACKGROUND OF THE INVENTION

1. Field of the Invention

The present invention relates to a large capacity storage system and, more particularly, to a split parity spare disk achieving method for improving the defect endurance and performance of a RAID (Redundant Arrays of Inexpensive Disks) subsystem.

2. Descariprion of the Related Art

The performance of a computer system depends on a central processing unit an input/output subsystem. Recently, the develpoment of a VLSI (Very Large Scale Integration) technique has led to a great improvement in the processing speed of the central processing unit. However, since the input/output subsystem shows a slight improvement in performance, the proportion of input/output processing time to the entire processing time of the system has gradually increased. Furthermore, as there has been a gradual increase in data recovery costs during the occurrence of an error in the input/output subsystem, there has arisen the necessity of developing a input/output subsystem having a superior performance and reliability. One research on an improvement in the performance of the input/output subsystem concerns a RAID subsystem. A general input/output subsystem sequentially inputs/outputs data in/from one disk drive, whereas the RAID subsystem implements an input/output operation in parallel by distributively storing data in a disk array consisting of a plurality of disk drives. Hence, the input/output operation is rapidly processed. Even if there is an error, since it is possible to recover data by using simple parity information, the reliability is improved. Currently, a technique related to the RAID subsystem is in a commercially available stage beyond a theory establishing stage. In universities, an active theoretical study has been done through a study on the RAID algorithm and an experiment using simulation. Enterprises have endeavored to improve the input/output performance and to ensure the reliability by deriving things to be reformed through various performance measurements. The disk array has been used in a supercomputer such as Cray for the input/output improvement of the disk drive. The concept of the RAID subsystem was established with a publication by three computer scientists of Berkeley University in the United States in 1988. The RAID theory is applicable to a sequential access device such as a cartridge tape among input/output devices, but its main concern is about a hard disk device.

A RAID structure is classified into 6 RAID levels from level 0 to level 5 according to its characteristics. The 6 RAID levels have merits and demerits according to environments suitable for each characteristic and are used in various application fields. Each RAID level provides a solution to various data storage devices or a reliability problem. The contents of each RAID level will now be described.

RAID Level 0

The RAID level 0 takes an interest in the performance rather than the reliability of the data. The data is distributively stored in all the disk drives of the disk array. Different controllers are used to connect the disk drives of the disk array to each other. The RAID level 0 has an advantage in that the input/output performance is improved by simultaneously accessing the data by using the different controllers.

RAID Level 1

The contents of all the disk drives are identically stored in a copy disk drive. Such a method is called a mirroring system. The mirroring system improves the performance of the disk drive but has an economic burden. That is, the RAID level 1 has a disadvantage in that only 50% of the disk is used in a system requiring a disk space of large capacity such as a database system. However, since the same data exists in the copy disk drive, the RAID level 1 is preferable in the maintenance of the reliability.

RAID Level 2

The RAID level 2 is used to reduce the economic burden of the RAID level 1. The RAID level 2 distributively stores data in each disk drive constituting the disk array by the unit of a byte. A hamming code is used to recognize and correct an error. Hence, the RAID level 2 has several check disk drives in addition to data disk drives.

RAID Level 3

When there is needed an input/output operation, the input/output operation of the data to the disk drive is carried out in parallel. Parity data is stored in an additional disk drive. A spindle motor for driving the disk is synchronized so that all the disk drives may simultaneously input/output the data. Therefore, it is possible to transmit the data rapidly even if the input/output operation of the data is not simultaneously implemented. If there is a failure in one disk drive, the failed data can be recovered by using the disk drive which is normally being operated and the parity disk drive. In this case, an entire data rate is lowered.

The RAID level 3 is used in a supercomputer, an image manipulation processor, etc. requiring a very fast data transmission rate. The RAID level 3 shows high efficiency in the transmission of a long data block (for example, about 50 data blocks) but it is ineffective in a short data block (for example, about 5 data blocks). The RAID level 3 uses one disk drive for redundancy together with the data disk drive. Consequently, the RAID level 3 needs the smaller disk drive in number than the RAID level 1, but the controller becomes complicated and expensive.

RAID Level 4

In the RAID level 4, data is stripped across to a plurality of disk drives constituting the disk array. In other words, a storage area of each disk drive is divided into a plurality of regions each having a striping size of the unit of a block, and the data corresponding to the striping size is stored across in each disk drive. Parity data calculated by using the data is stored in an additional disk drive within the disk array.

The RAID level 4 can be recovered when the data fails, and its read performance is similar to the RAID level 1. However, the write performance is considerably lowered in comparison with a single disk drive since the parity information should be supplied to an a specially provided disk drive (in this case, a bottle neck phenomenon is generated). The RAID level 4 is compensated by the RAID level 5 of which the write performance is improved.

RAID Level 5

In the RAID level 5, data is striped across in each disk drive of the disk array. In order to eliminate the bottle neck phenomenon during writing, the parity data is distributively stored in all the disk drives. When writing the data, since the data written in all the disk drives should be read to again calculate the parity data, the speed is as slow as the RAID level 4. However, it is possible to simultaneously process the data input/output transmission. The data of the failed disk drive can be recovered.

RAID level 5 is effective in writing long data. If data read is given much weight in an application or the write performance is given much weight in array design, RAID level 5 may be effective in writing short data. If the size of the data block is reduced, the proper performance and data availability can be obtained. RAID level 5 is very effective in cost in comparison with a non-array device.

RAID level 5 has a structure without the loss of data even if one disk drive constituting the disk array fails. However, when the disk drive fails, if instantaneous recovery work is not done, there may be additional failure and thus the loss of data may be generated. To prevent the loss of the data, the RAID level 5 has an on-line spare disk drive or a hot-spare disk drive.

U.S. Pat. No. 5,530,948 to S. M. Rezaul Islam entitled System And Method For Command Queuing On Raid Levels 4 And 5 Parity Drives provides further discussion of the various RAID levels and contemplates a system providing a set of mass storage devices that collectively perform as one or more logical mass storage devices utilizing command queuing on parity drives in RAID level 4 and RAID level 5 systems.

U.S. Pat. No. 5,388,108 to Robert A. DeMoss, et al., entitled Delayed Initiation Of Read-Modify-Write Parity Operations In A RAID Level 5 Disk Array contemplates a method of generating new parity information by reading old data and old parity information from first and second disk drives, respectively, and exclusively ORing the old data and old parity information with new data.

U.S. Pat. No. 5,331,646 to Mark S. Krueger et al. entitled Error Correcting Code Technique For Improving Reliability Of A Disk Array contemplates a system having a large number of data disk drives, a plurality of parity disk drives and a pair of spare disk drives, wherein each data disk drive is included in at least two parity chains and there are no two data drives associated with the same combination of parity chains.

It is noted here that the spare drive within the disk array is not used when the disk array is normally operated, that is when there is no drive failure requiring the system to replace any of the data disk drives or the parity disk drives. Accordingly the non-use of the spare disk drive is a waste of resources. Consequently, the performance of the above noted RAID subsystems is lowered.

SUMMARY OF THE INVENTION

It is therefore an object of the present invention to provide a method for improving the defect endurance and performance of a RAID subsystem.

It is another object of the present invention to provide a method for improving an inefficient use of a spare drive in the structure of a RAID level 5.

It is still another object of the present invention to provide a split parity spare disk achieving method for solving a bottle neck phenomenon generated in the structure of a RAID level 4.

According to one aspect of the present invention, a split parity spare disk achieving method for improving the defect endurance and performance of a RAID subsystem which distributively stores data in a disk array consisting of a plurality of disk drives and carries out an input/output operation in parallel includes the steps of: constructing the disk array with at least two data disk drives for storing data, a spare disk drive used when a disk drive fails and a parity disk drive for storing parity data; and splitting the parity data of the parity disk drive and storing the split data in the parity disk drive and the spare disk drive.

In the present invention, a "data disk drive" for storing data, a "spare disk drive" used when a disk drive fails, and a "parity disk drive" for storing parity data are referred to as a "data drive", a "spare drive", and a "parity drive" respectively.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 4 is an exemplary diagram introduced to describe a method for generating and arranging parity data distributively stored in data drives of the structure of the RAID level 5;

DETAILED DESCRIPTION OF THE INVENTION

In the following description, numerous specific details, such as the number of disk drives constituting a disk array, are set forth to provide a more thorough understanding of the present invention. It will be apparent, however, to one skilled in the art, that the present invention may be practiced without these specific details. In other instances, well known features and constructions are not described so as not to obscure the present invention.

Figure 1:
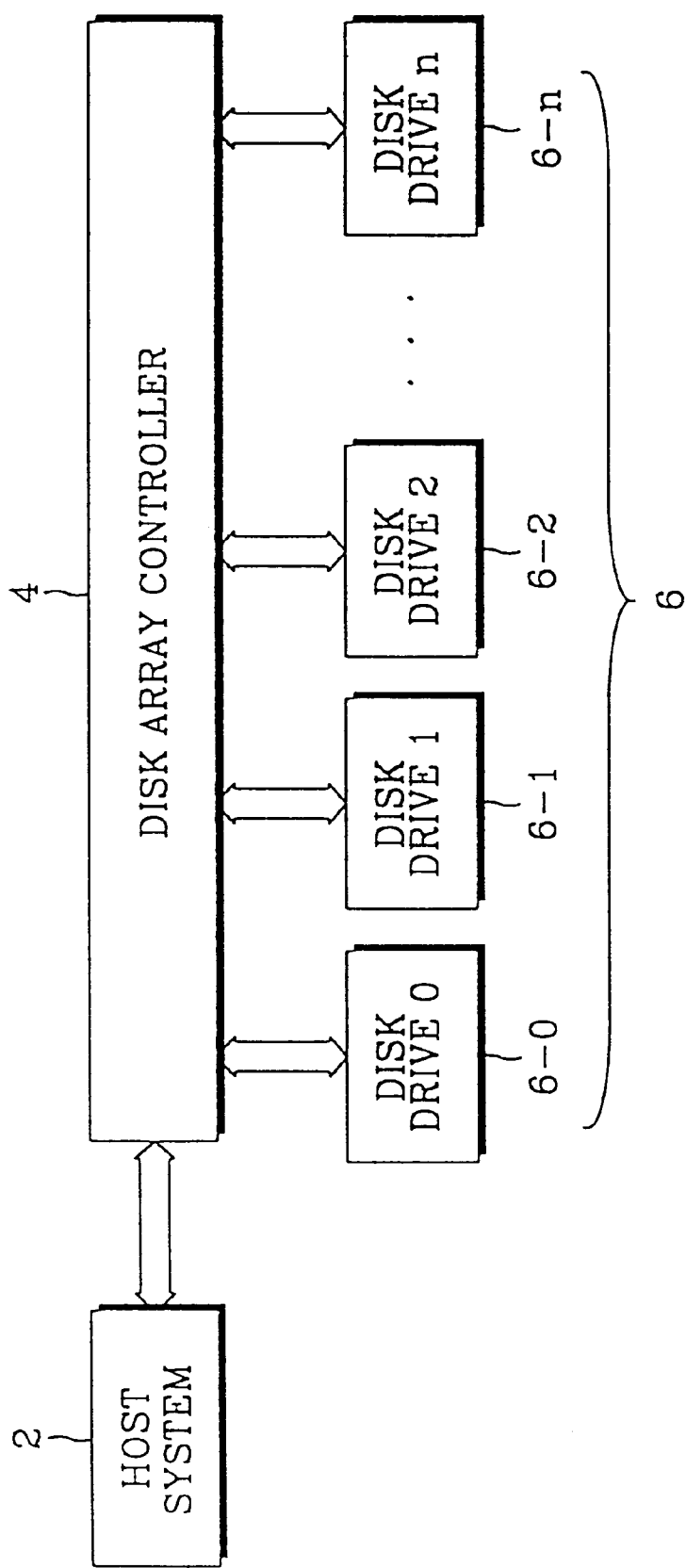
FIG. 1 is a block diagram of an exemplary RAID subsystem applied to a hard disk device.

FIG. 1 illustrates a exemplary RAID subsystem. The RAID subsystem includes a disk array controller 4 and a disk array 6 consisting of a plurality of disk drives 6-0, . . . ,6-n. The disk array controller 4 connected between a host system 2 and the disk array 6 reads/writes data from/in the disk drivers 6-0, . . . ,6-n of the disk array 6 according to a data read/write command of the host system 2. In this case, the disk array controller 4 distributively stores the data in each disk drive of the disk array 6, processes an input/output operation in parallel, and, during the occurrence of an error, recovers the data by using simple parity information.

Figure 2:
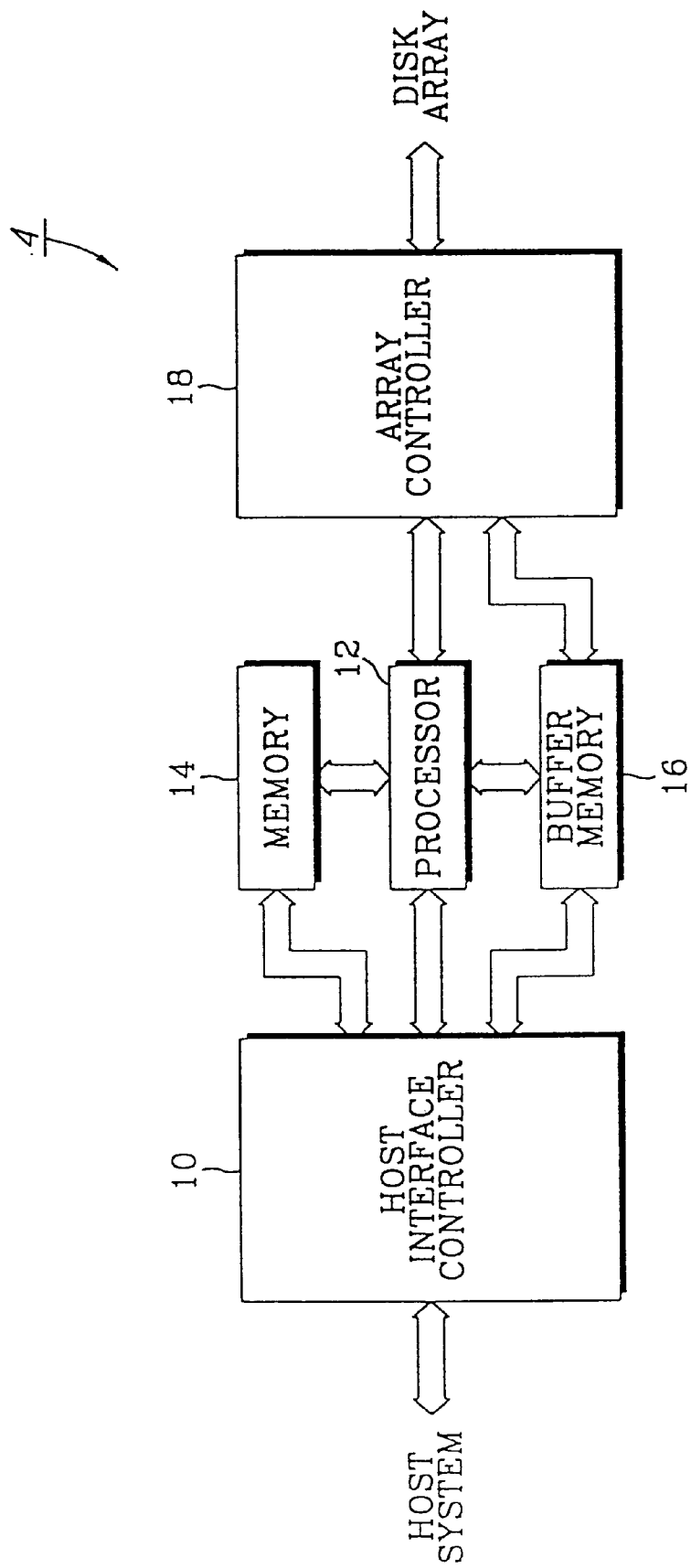
FIG. 2 is a more detailed block diagram of a disk array controller shown in FIG. 1.

FIG. 2 illustrates the disk array controller 4 in detail. The disk array controller 4 includes a host interface controller 10, a processor 12, a memory 14, a buffer memory 16 and an array controller 18. The host interface controller 10 interfaces data transmitted and received between the host system 2 and the processor 12. The processor 12 controls the overall operation of the disk array subsystem. The memory 14 connected to the host interface controller 10 has a ROM (read only memory) for storing a control program of the processor 12 and a RAM (random access memory) for temporarily storing data generated during a control operation. The buffer memory 16 temporarily stores a data writing/regenerating command and data transmitted and received between the host system 2 and the disk array 6 under the control of the processor 12. The array controller 18 interfaces and controls various data transmitted and received between the processor 12 and the disk array 6.

The RAID subsystem constructed in the above-mentioned way is for improving the performance of an input/output device, enlarging the capacity thereof and establishing the reliability thereof by decentralization or striping of data to the disk drive, the mirroring of the disk with repeated data, etc. The RAID theory is applicable to a sequential access device such as a cartridge tape among input/output devices, but its main concern is about a hard disk device.

Figure 3:
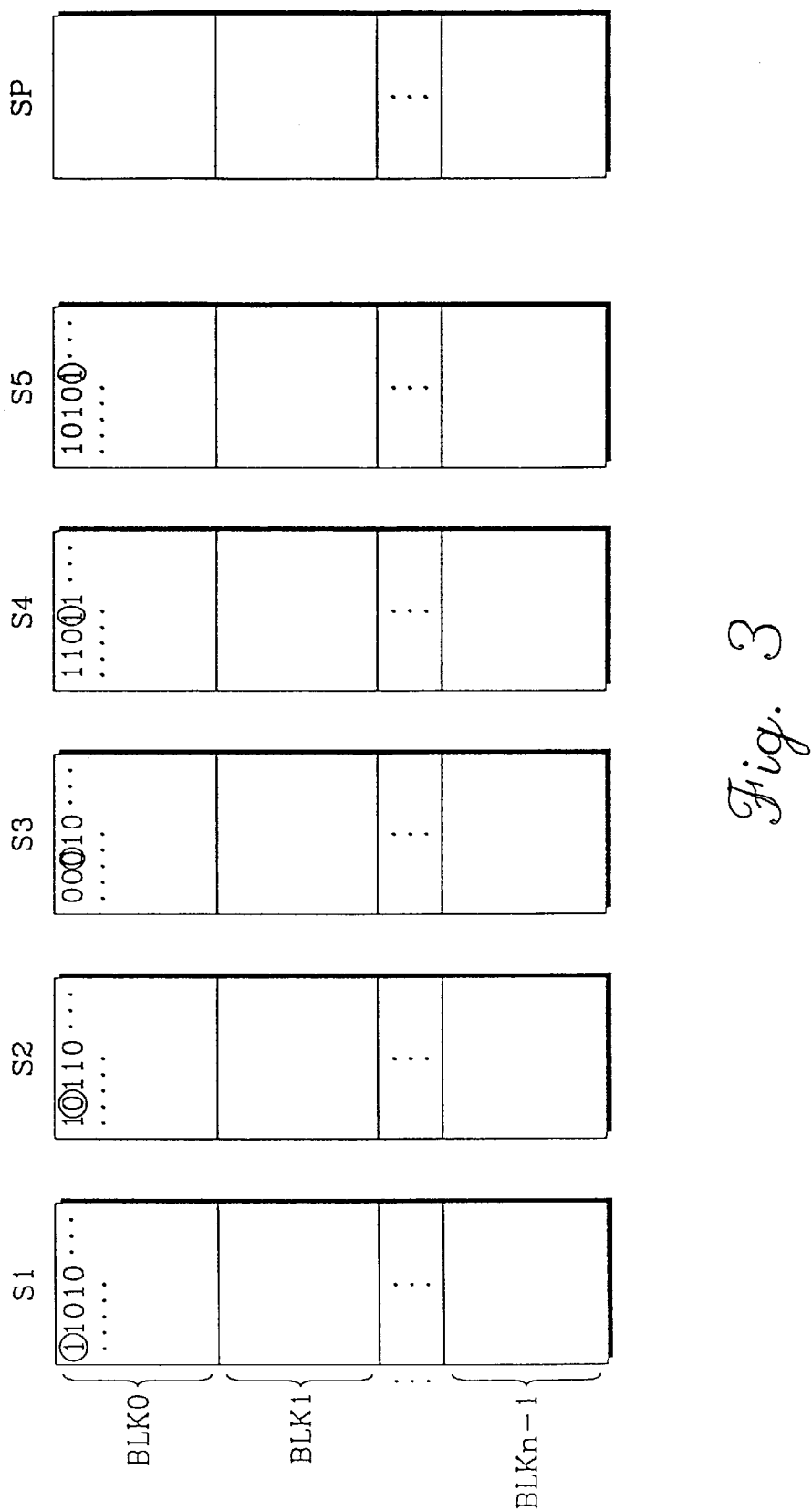
FIG. 3 illustrates one example of a disk array to which the structure of a RAID level 5 is applied.

FIG. 3 illustrates one example of the disk array to which the structure of the RAID level 5 is applied. The disk array has 5 disk drives (hereinafter referred to as the data drives) S1–S5 for storing data, and one spare disk drive (hereinafter referred to as the spare drive) SP. A storage region of each data drive consists of n blocks BLK0, . . . ,BLKn–1. The size of a unit block is called a striping size and has 512 bytes or so, typically. The data is sequentially stored in the first block BLK0 of each of the data drives S1–S5. Thereafter, the data is sequentially stored in the second block BLK1 of each of the data drives S1–S5. Namely, the data is stored in the disk array in the order of: the first block BLK0 of the first data drive S1→the first block BLK0 of the second data drive S2→ . . . →the first block BLK0 of the fifth data drive S5→the second block BLK1 of the first data drive S1→the second block BLK1 of the second data drive S2→ . . . →the n-th block BLKn–1 of the fifth data drive S5.

When the data is stored in the data drives S1–S5, parity data is also distributively stored in each data drive. In FIG. 3, the parity data is indicated by the encircled data in the first block BLK0 of each data drive. The parity bit is distributively arranged in the first bit of the first data drive S1, the second bit of the second data drive S2, the third bit of the third data drive S3, and the like. The k-th parity data distributively stored in the data drives S1–S5 is generated by exclusively ORing the k-th data of drives except the drive in which that parity data is stored. This will be described in detail with reference to FIG. 4.

FIG. 4 is an exemplary diagram introduced to describe a method for generating and arranging the parity data distributively stored in the data drives S1–S5. Referring to FIG. 4, the parity data "1" among the first bit data is in the first data drive S1 and is obtained by exclusively ORing the first bit data of the data drives S2–S5 except the first data drive S1. The parity data "0" among the second bit data is in the second data drive S2 and is obtained by exclusively ORing the second bit data of the data drives S1 and S3–S5 except the second data drive S2. The parity data "0" among the third bit data, the parity data "1" among the fourth bit data, the parity data "1" among the fifth bit data are obtained in the above-mentioned way. The method for generating the parity data can be represented by the following mathematical expression (1) where $\oplus$ is a symbol indicating exclusive OR.

Mathematical Expression (1)

parity data of first data drive $S1=S2\oplus S3\oplus S4\oplus S5= 1\oplus 0\oplus 1\oplus 1\oplus =1$, parity data of second data drive $S2=S1\oplus S3\oplus S4\oplus S5= 1\oplus 0\oplus 1\oplus 0=0$, parity data of third data drive $S3=S1\oplus S2\oplus S4\oplus S5= 0\oplus 1\oplus 0\oplus 1=0$, parity data of fourth data drive $S4=S1\oplus S2\oplus S3\oplus S5= 1\oplus 1\oplus 1\oplus 0=1$, and parity data of fifth data drive $S5=S1\oplus S2\oplus S3\oplus S4= 0\oplus 0\oplus 0\oplus 1=1$.

The parity data generated by the above-described method is distributively stored in the data drives S1–S5.

In the disk array with the structure of the RAID level 5, the data drives S1–S5 are used to store the data and the parity data. However, the spare drive SP is not used when the disk array is normally operated. The spare drive SP is in a standby state during a normal operation of the disk array. If a specific data drive fails, the spare drive is used instead of the failed data drive. Assuming that the first data drive S1 shown in FIG. 3 fails, the disk array controller 4 recovers the data of the first data drive S1 by exclusively ORing the data of the data drives S2–S5 and writes the recovered data in the spare drive SP.

In the preferred embodiment of the present invention, a disk array consisting of a plurality of disk drives has a structure in which a RAID level 4 and a RAID level 5 are combined. That is, the disk array uses a parity drive used in the structure of the RAID level 4 and a spare drive used in the structure of the RAID level 5 together with a plurality of data drives.

Figure 5:
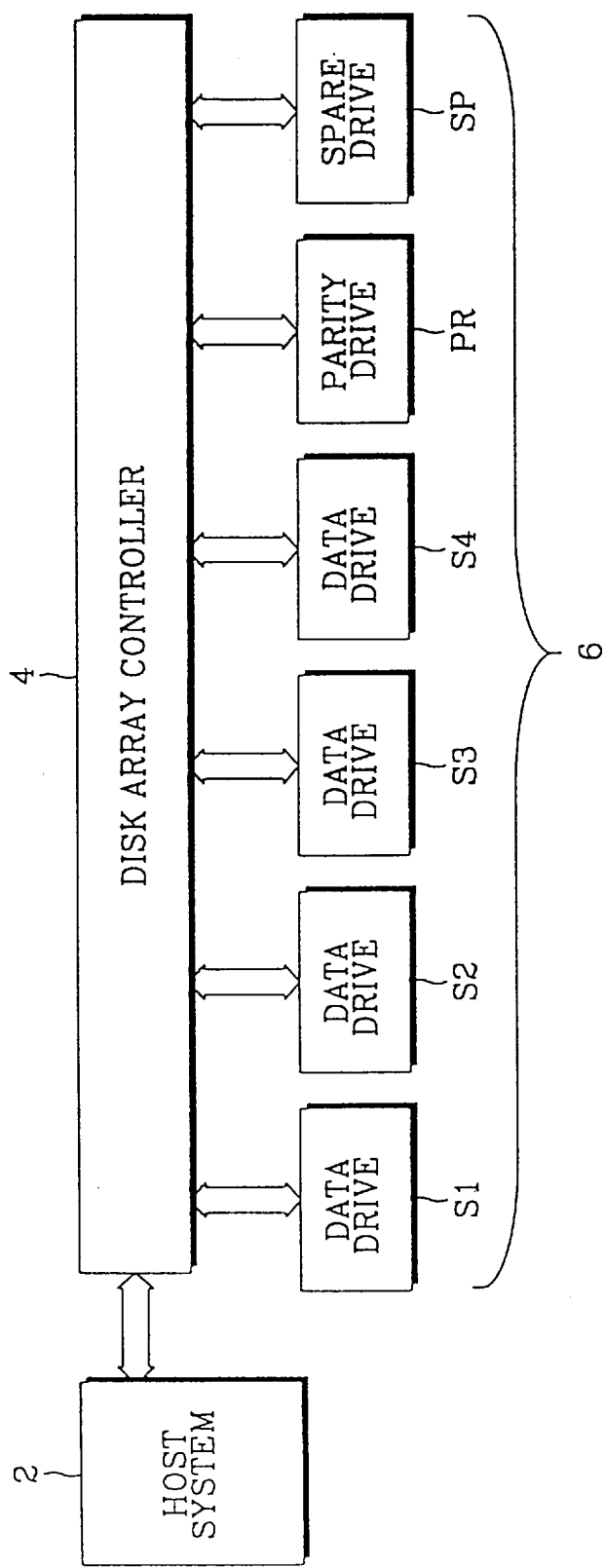
FIG. 5 is a block diagram of a RAID subsystem according to the principles of the present invention.

FIG. 5 illustrates a RAID subsystem according to the principles of the present invention. A disk array controller 4 is connected to a host system 2 and connected to a disk array 6 through buses. The disk array controller 4 distributively stores data in each disk drive of the disk array 6, processes an input/output operation in parallel, and, during the occurrence of an error, recovers the data by using parity data. A principal operation of the disk array controller 4 is to control a split parity spare disk. The control of the split parity spare disk, which will be described in detail later on, is classified into an initialization control mode part, a normal control mode part, and a data recovery control mode part for restoring the data when the drive fails.

The disk array 6 consists of a plurality, e.g., 4, of data drives S1–S4, at least one parity drive PR and at least one spare disk drive SP. As shown in FIG. 5, disk array 6 is constructed with 6 disk drives for convenience. Therefore, the construction of the disk drives of the disk array 6 may differ according to the needs of the user. A corresponding storage region of the disk drives S1–S4, PR and SP of the disk array 6 is divided into blocks with a striping size (512 bytes for example).

Hereinafter, the operation of an initialization control mode, a normal operation mode and a data recovery control mode will be described in detail.

Initialization Control Mode

Figure 6A:
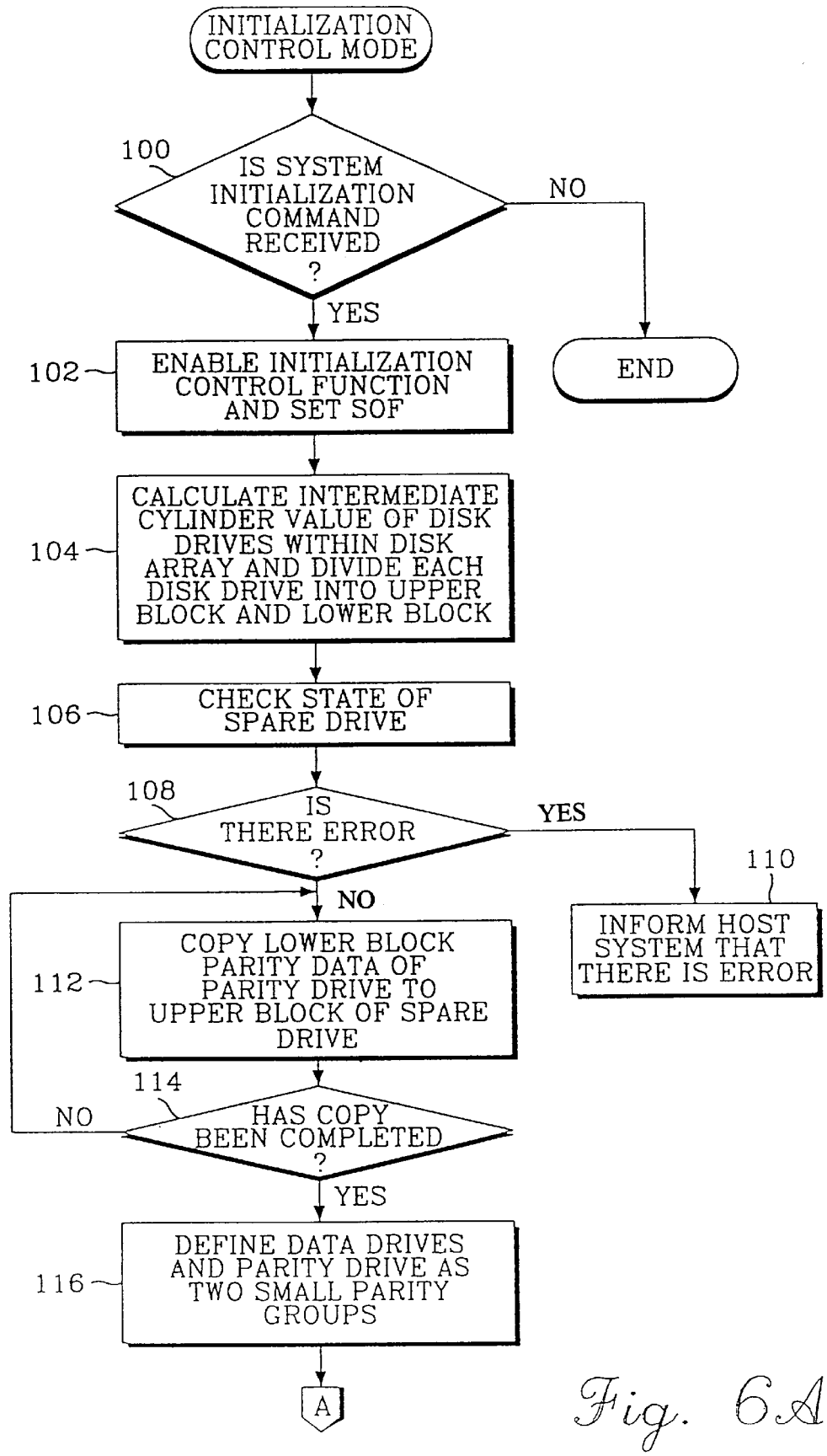
FIGS. 6A and 6B are a flow chart of an initialization control mode implemented in a disk array controller according to the principles of the present invention.
Figure 6B:
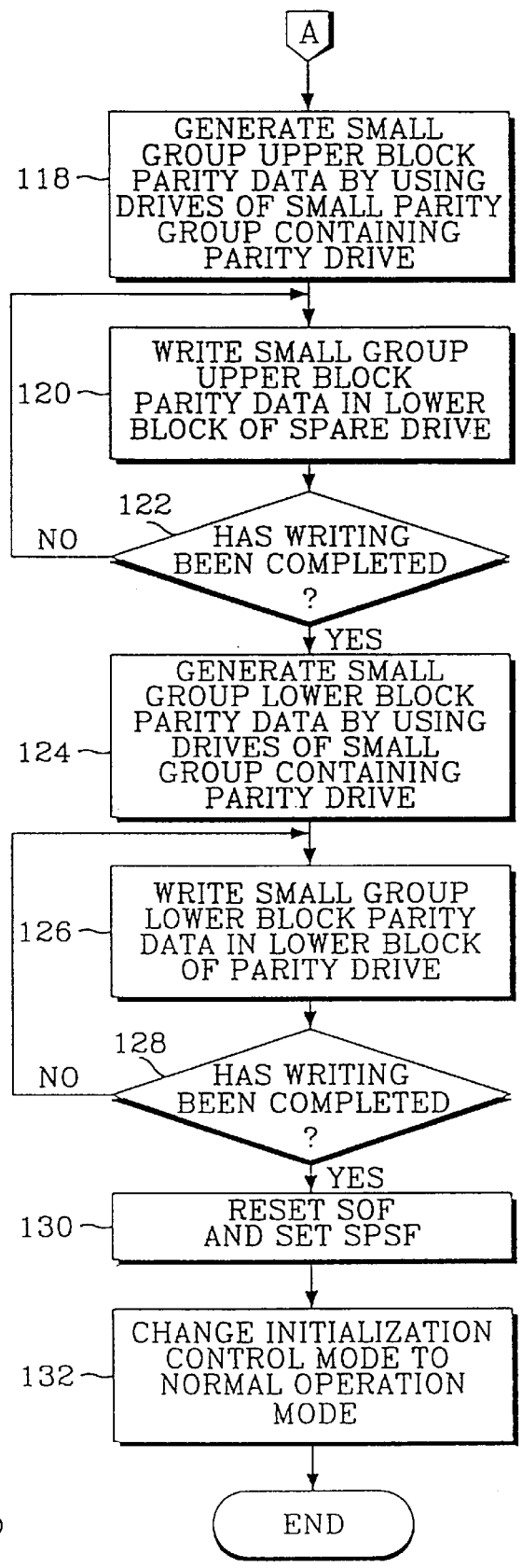
Figure 7:
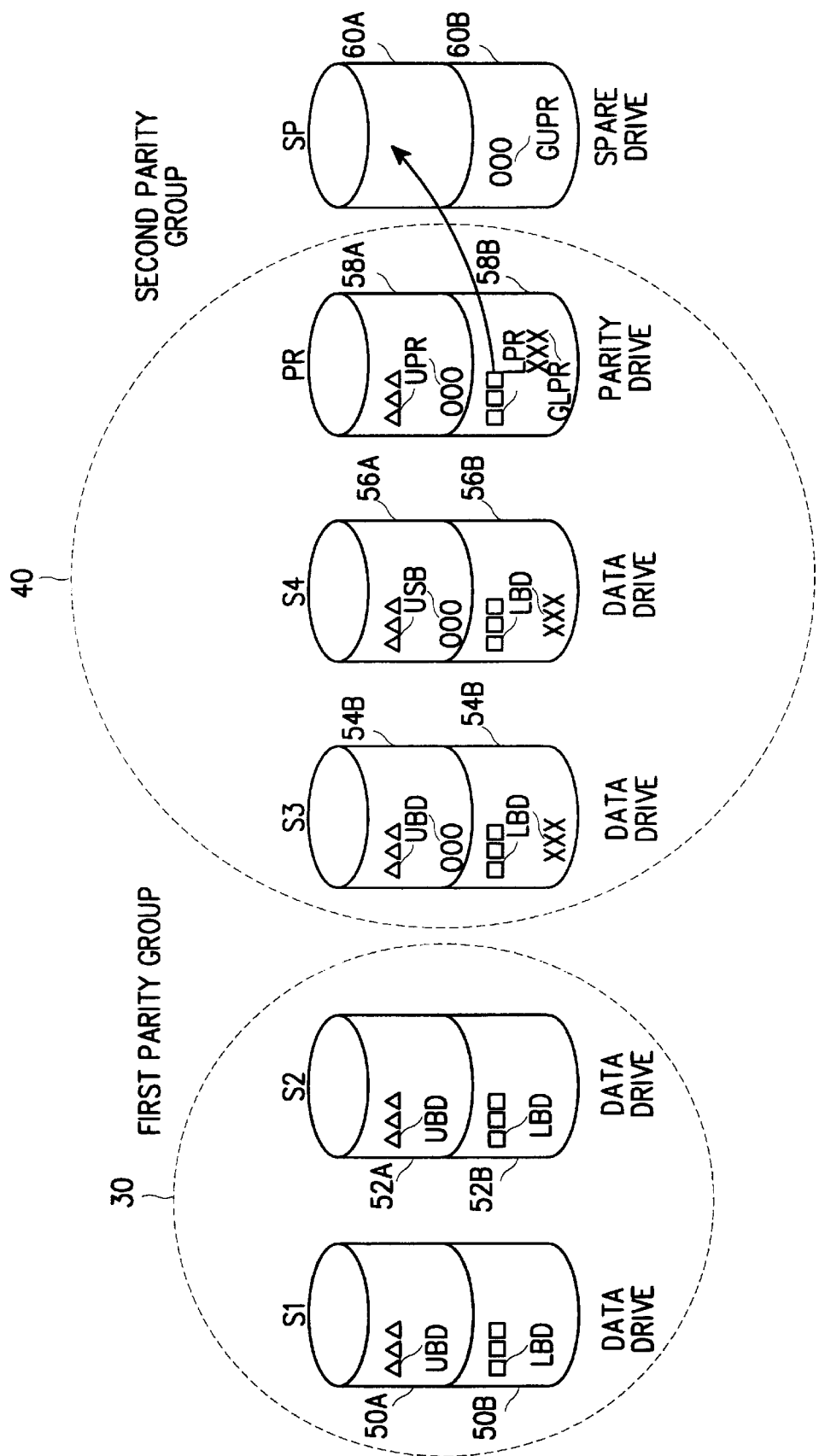
FIG. 7 illustrates the state of a disk array according to the initialization control mode of FIGS. 6A and 6B.
Figure 8:
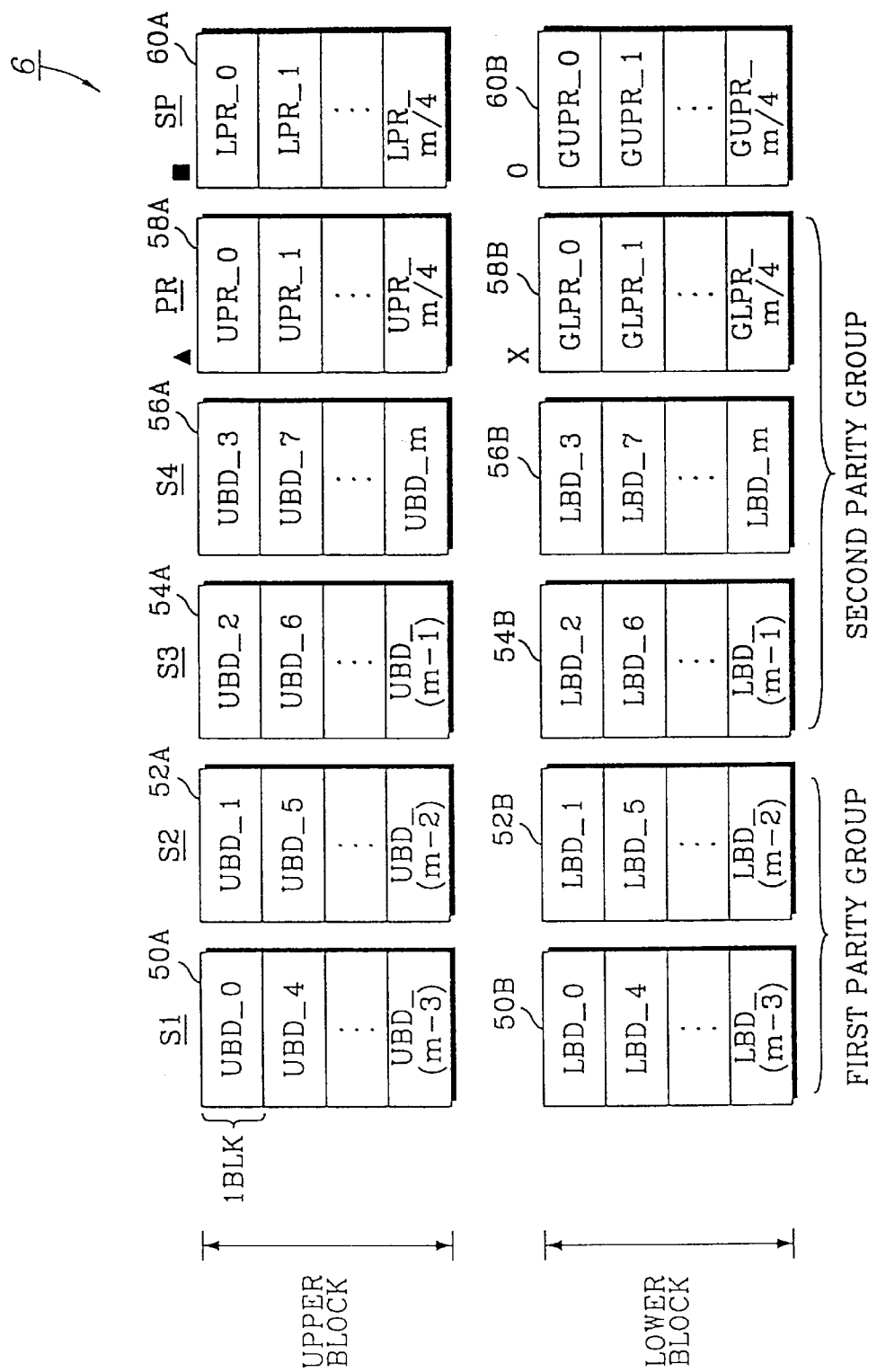
FIG. 8 illustrates the formatted state of disk drives within the disk array according to a result of the initialization control mode of FIGS. 6A and 6B.

During the initialization control mode of the disk array controller 4, the disk drives S1–S4, PR and SP are divided into small parity groups and a corresponding storage region is divided into a upper block and a lower block. FIGS. 6A and 6B are a flow chart of the initialization control mode implemented in the disk array controller 4. FIG. 7 illustrates the state of the disk array 6 according to the initialization control mode of FIGS. 6A and 6B. FIG. 8 illustrates the formatted state of the disk drives within the disk array 6 according to a result of the initialization control mode of FIGS. 6A and 6B.

The initialization control operation of the disk array controller 4 and the state of the disk drives within the disk array 6 will now be described with reference to FIGS. 5–8. If the disk array controller 4 receives a system initialization command from the host system 2, the disk array controller 4 confirms this at step 100. At step 102, the disk array controller 4 enables an initialization control function and sets a split-on flag SOF. At step 104, the disk array controller 4 calculates an intermediate cylinder value of the disk drives constituting the disk array 6, that is, of the data drives S1–S4, the parity drive PR and the spare drive PR and divides each disk drive into an upper block and a lower block. Referring to FIG. 7 or 8, reference numerals 50A, 52A, 54A, 56A, 58A and 60A indicate the upper blocks of the disk drives, and 50B, 52B, 54B, 56B, 58B and 60B designate the lower blocks of the disk drives. In FIG. 8, the upper and lower blocks of the data drives S1–S4 are respectively divided into blocks, and their block data UBD_0, UBD_1, ..., UBD_m, LBD_0, LBD_1, ...,LBD_m (where m is a multiple of 4) are striped across. The block data indicates data stored in a unit block (512 bytes for example).

Turning to FIG. 6A, the disk array controller 4 checks, at step 106, the state of the spare drive SP. At step 108, the disk array controller 4 checks whether there is an error in the spare drive SP. If there is an error, the disk array controller 4 informs, at step 110, the host system 2 that there is an error. If there is no error, the disk array controller 4 copies, at step 112, lower block parity data LPR stored in the lower block 58B of the parity drive SP to the upper block 60A of the spare drive SP. The parity data stored in the parity drive PR is calculated by exclusively ORing of the data of the data drives S1–S4. Referring to FIG. 7, the upper block data UBD (indicated by ▲) of the data drives S1–S4 are exclusively ORed to generate upper block parity data UPR. The upper block parity data UPR (indicated by ▲) is stored in the upper block 58A of the parity drive PR. The lower block data LBD (indicated by ■) of the data drives S1–S4 are exclusively ORed to generate the lower block parity data LPR. The lower block parity data LPR (indicated by ■) is stored in the lower block 58B of the parity drive PR. By the copy control at step 112 of FIG. 6, the lower block parity data LPR is stored in the upper block 60A of the spare drive SP.

The disk array controller 4 checks, at step 114, whether copying has been completed. If so, the disk array controller 4 defines, at step 116, the drives except the spare drive SP, that is, the data drives S1–S4 and the parity drive PR as two small parity groups. For example, the data drives S1 and S2 are defined as a first parity group 30, and the data drives S3 and S4 and the parity drive PR are defined as a second parity group 40, as shown in FIGS. 7 and 8.

At step 118, the disk array controller 4 generates small group upper block parity data GUPR by using the upper block data UBD and UPR (indicated by O in FIG. 7) of the disk drives S3, S4 and PR contained in the small parity group including the parity drive PR, that is, contained in the second parity group 40. At step 120, the disk array controller 4 writes the small group upper block parity data GUPR (indicated by O in FIG. 7) in the lower block 60B of the spare drive SP. The disk array controller 4 checks, at step 122, whether writing has been completed.

If the writing has been completed, the disk array controller 4 generates, at step 124, small group lower block parity data GLPR by using the lower block data LBD and LPR (indicated by X in FIG. 7) of the disk drives S3, S4 and PR contained in the second parity group 40. At step 126, the disk array controller 4 writes the small group lower block parity data GLPR (indicated by X in FIG. 7) in the lower block 58B of the parity drive PR. The disk array controller 4 checks, at step 128, whether the writing has been completed. If so, the disk array controller 4 resets the split-on flag SOF and sets a split parity spare flag SPSF indicating parity splitting has been completed, at step 130. At step 132, the disk array controller 4 changes the initialization control mode to the normal operation mode.

The state of the disk array 6 after the initialization control operation is completed is shown in FIGS. 7 and 8. The upper block parity data UPR is stored in the upper block 58A of the parity drive PR. The small group lower block parity data GLPR is stored in the lower block 58B of the parity drive PR. The lower block parity data LPR is stored in the upper block 60A of the spare drive SP. The small group upper block parity data GUPR is stored in the lower block 60B of the spare drive SP.

After the initialization control mode is ended, the normal operation mode which will now be described is implemented.

Normal Operation Mode

Figure 13A:
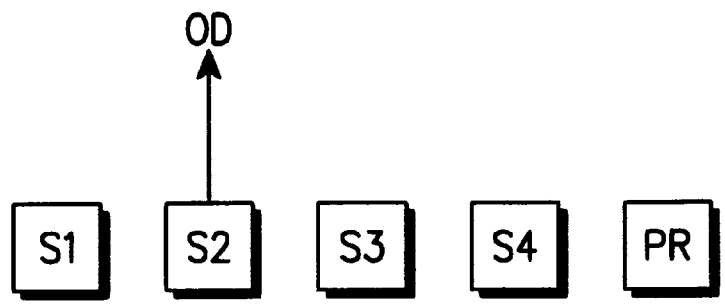
FIGS. 13A and 13B illustrate an operation for reading/writing data at a RAID level 4 during a normal operation mode.
Figure 13B:
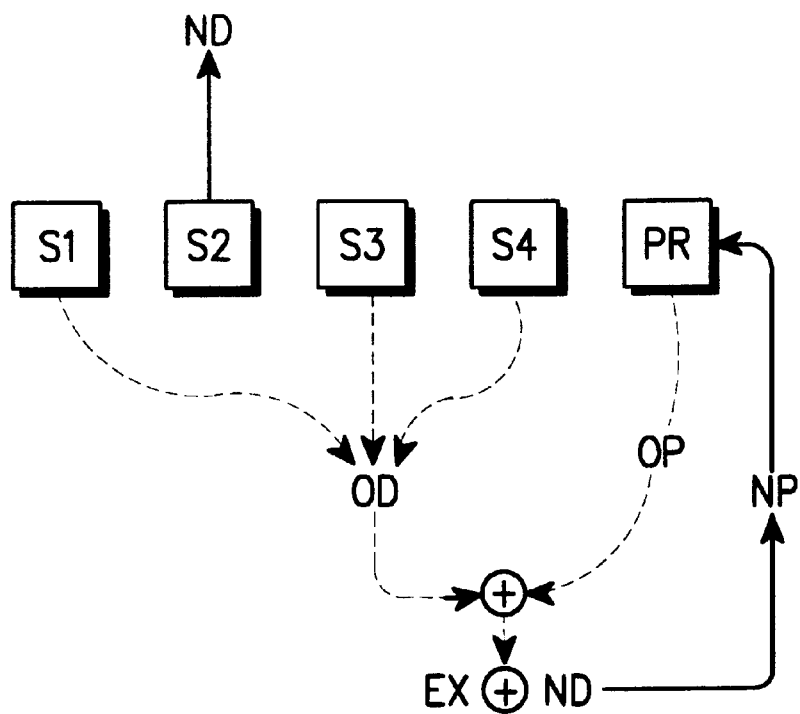

For comparison, the normal operation at the RAID level 4 is described with reference to FIGS. 13A and 13B. In a data read operation, the disk array controller directly reads data OD from a corresponding data drive S2 as shown in FIG. 13A. A data write operation is as follows. The disk array controller writes new data ND in the corresponding data drive S2. To generate the parity data for the new data ND, the disk array controller reads out data OD and OP from the storage regions corresponding to the storage region of the new data ND of the disk drives except the data drive S2, that is, of the disk drives S1, S3, S4 and PR. The data OD and OP are exclusively ORed to generate changed data EX. The data EX and the data ND newly stored in the data drive S2 are exclusively ORed to generate new parity data NP. The generated parity data NP is stored in the parity drive PR.

Figure 14A:
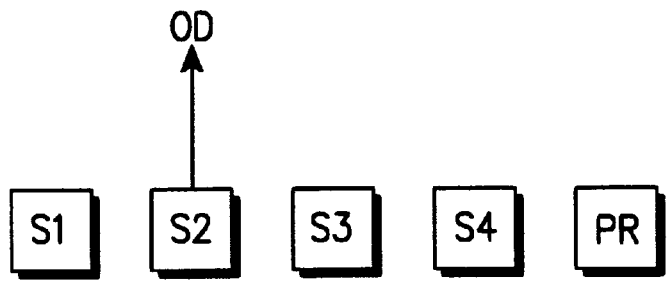
FIGS. 14A and 14B illustrate an operation for reading/writing data from/in a data drive in a first parity group during a normal operation mode according to the principles of the present invention.
Figure 14B:
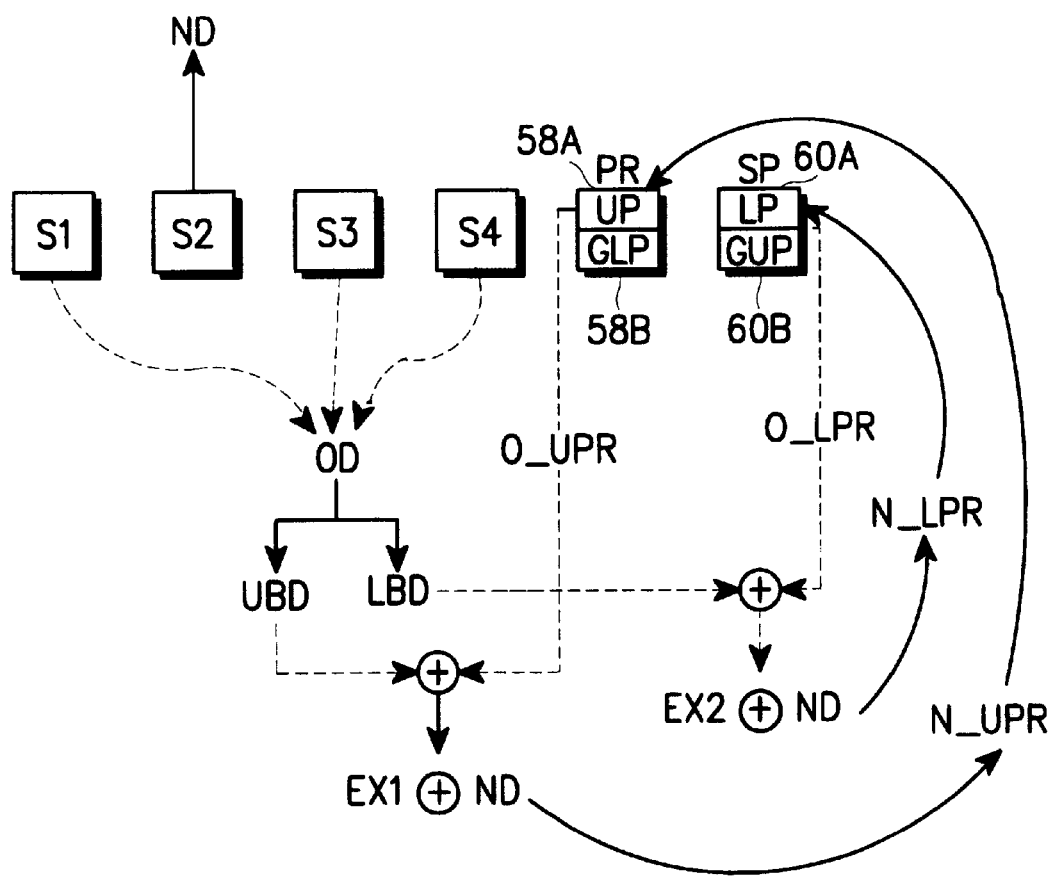
Figure 15A:
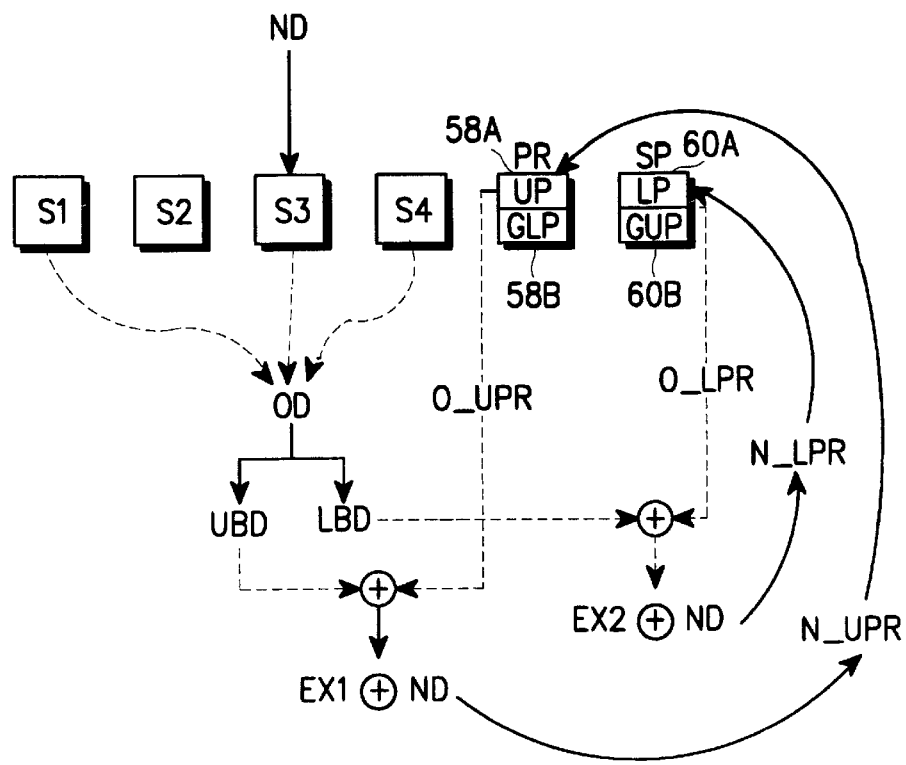
FIGS. 15A and 15B illustrates an operation for writing data in a data drive in a second parity group during a normal operation mode according to the principles of the present invention.
Figure 15B:
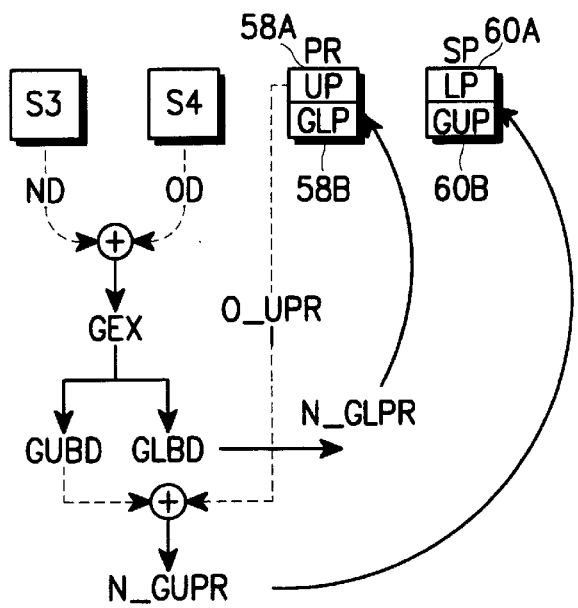

Meanwhile, the data read/write operation during the normal operation mode according to the present invention is shown in FIGS. 14A, 14B, 15A and 15B. In FIGS. 14A and 14B, data is read/written from/in the data drive S1 or S2 in the first parity group 30 during the normal operation mode. In FIGS. 15A and 15B, data is read/written from/in the data drive S3 or S4 in the second parity group 40 during the normal operation mode.

The operation for reading/writing the data from/in the data drive S1 or S2 in the first parity group 30 will now be described with reference to FIGS. 14A and 14B. In the data read operation, the disk array controller 4 directly reads out the data OD from the corresponding data drive S2 as indicated in FIG. 14A.

In the data write operation, the disk array controller 4 writes the new data ND in the corresponding data drive S2 as shown in FIG. 14B. To generate the parity data for the new data ND, the disk array controller 4 reads out the data OD from the storage regions corresponding to the storage region of the new data ND of the data drives Si, S3 and S4 except the data drive S2. If the storage region of the read data OD is the upper block, since the read data is the upper block data UBD, the upper block data UBD is exclusively ORed with upper block parity data 0_UPR read from the upper block 58A of the parity drive PR to generate data EX1. The data EX1 is exclusively ORed with the new data ND stored in the data drive S2 to generate new upper block parity data N_UPR. The generated upper block parity data N_UPR is written in the upper block 58A of the parity drive PR. If the storage region of the read data OD read from the data drives S1, S3 and S4 is the lower block, since the read data is the lower block data LBD, the lower block data LBD is exclusively ORed with lower block parity data 0_LPR read from the upper block 60A of the spare drive SP to generate data EX2. The data EX2 is exclusively ORed with the new data ND stored in the data drive S2 to generate new lower block parity data N_LPR. The generated lower block parity data N_LPR is written in the upper block 60A of the spare drive SP.

When the new data ND is written in any one of the data drives S3 or S4 contained in the second parity group 40, the write operation is shown in FIGS. 15A and 15B. It is assumed that the new data ND is written in the data drive S3. The write operation shown in FIG. 15A is similar to that shown in FIG. 14B. Therefore, the upper and lower block parity data written in the upper blocks of the parity drive PR and the spare drive SP are changed to the new upper and lower block parity data N_UPR and N_LPR respectively. The small group lower and upper block parity data written in the lower blocks of the parity drive PR and the spare drive SP are changed to new small group lower and upper block parity data N_GLPR and N_GUPR respectively. This operation is shown in FIG. 15B.

Referring to FIG. 15B, in order to generate the parity data for the new data ND stored in the data drive S3, the new data ND is exclusively ORed with the data OD of the storage region corresponding to the storage region of the new data ND in the data drive S4 to generate changed data GEX.

If the storage regions of the data ND and OD are the upper block, since the changed data GEX is upper block data GUBD, the upper block data GUBD is exclusively ORed with the upper block parity data 0_UPR read from the upper block 58A of the parity drive PR to generate the new small group upper block parity data N_GUPR. The new small group upper block parity data N_GUPR is stored in the lower block 60B of the spare drive SP.

If the storage regions of the data ND and OD are the lower block, the changed data GEX is lower block data GLBD. Since the lower block data GLBD means the new small group lower block parity data N_GLPR, the disk array controller 4 writes the generated small group lower block parity data N_GLPR in the lower block 58B of the parity drive PR.

When any disk drive within the disk array 6 fails, the data recovery control mode will now be described in detail.

Data Recovery Control Mode

During the operation of the RAID subsystem, it is possible to recover the data when:

(1) one specific data drive among the data drives S1–S4 fails; (2) one data drive per a small parity group fails; (3) either the parity drive PR or the spare drive SP fails; and (4) both one data drive within the second parity group 40 and the spare drive SP fail.

Figure 9:
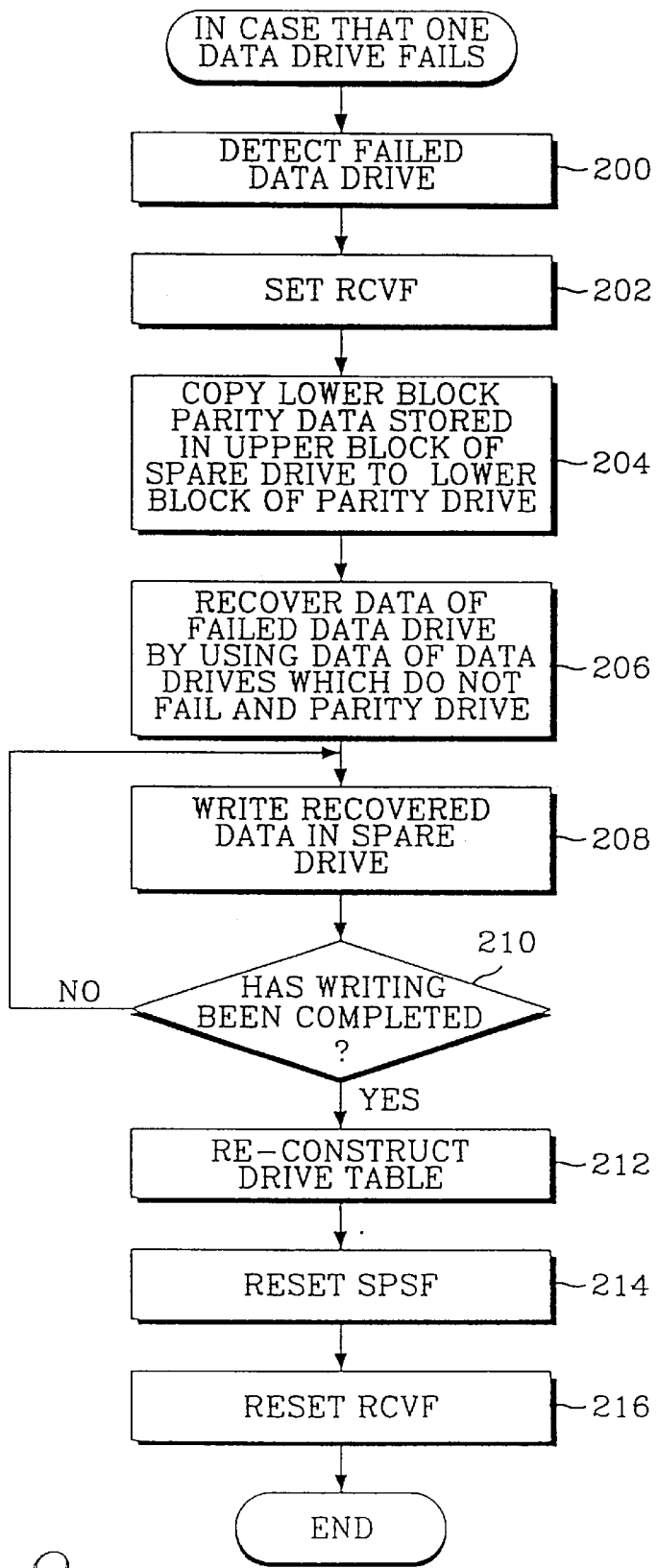
FIG. 9 is a flow chart illustrating a data recovery operation when one specific data drive among data drives fails according to the principles of the present invention.

When one specific data drive among the data drives S1–S4 fails, the data recovery operation is shown in FIG. 9. It is assumed that the data drive S1 within the disk array 6 fails.

If the data drive S1 fails, there is provided the spare drive SP so as to store data of the data drive S1. The data of the failed date drive S1 is recovered and the recovered data is stored in the spare drive SP.

In more detail, the disk array controller 4 detects the failed data drive S1 at step 200 shown in FIG. 9. At step 202, the disk array controller 4 sets a recovery flag RCVF. At step 204, the disk array controller 4 copies the lower block parity data LPR stored in the upper block 60A of the spare drive SP to the lower block 58B of the parity drive PR. Hence, the spare drive SP has the storage region which is capable of storing the data of the data drive S1.

The disk array controller 4 recovers, at step 206, the data of the failed data drive S1 by exclusively ORing the data of the data drives S2, S3 and S4 and the parity drive PR. At step 208, the recovered data of the data drive S1 is written in the spare drive SP. The disk array controller 4 checks, at step 210, whether writing has been completed. If so, the disk array controller 4 re-constructs a drive table at step 212. That is, the drive table is re-constructed so as to replace the data drive S1 with the spare drive SP. At step 214, the split parity spare flag SPSF is reset. At step 216, the recovery flag RCVF is reset. Since the split parity spare flag SPSF is reset, a parity check using the spare drive SP can no longer be implemented.

Figure 10A:
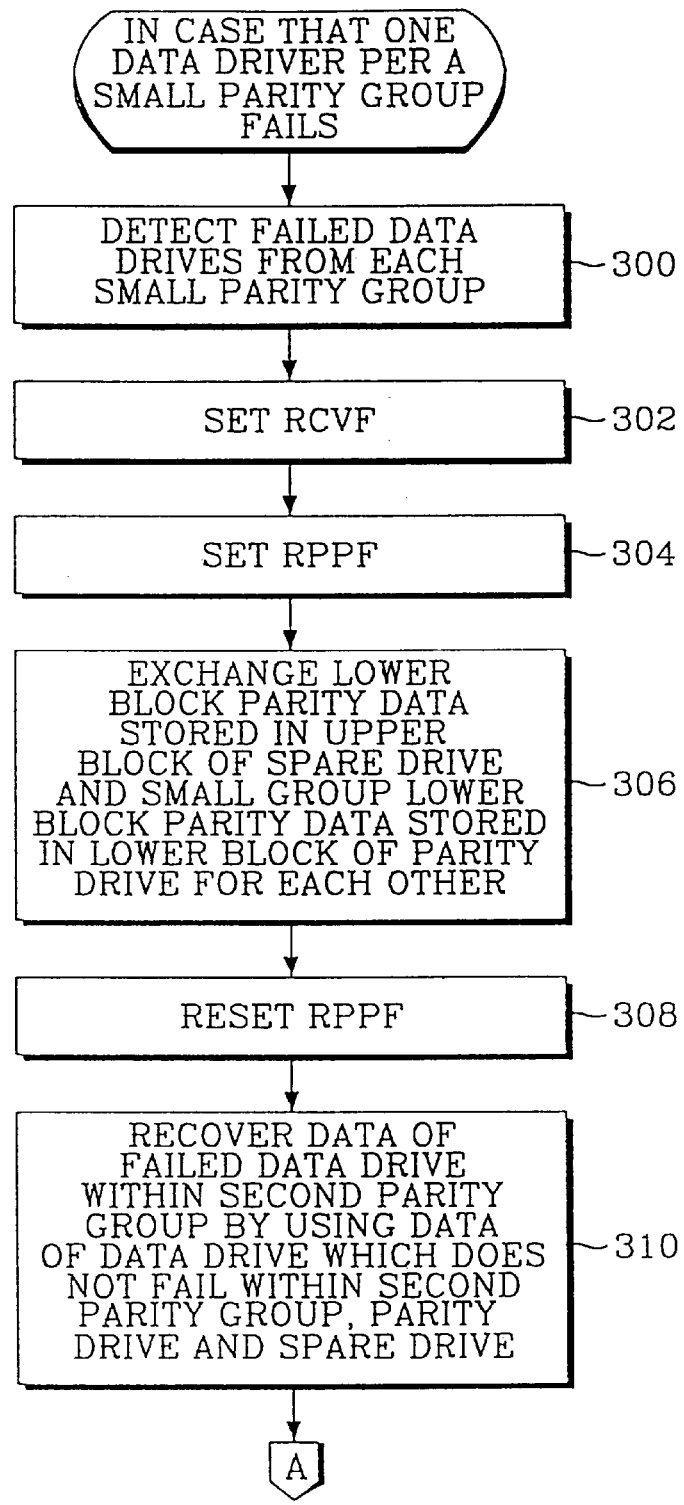
FIGS. 10A and 10B are a flow chart illustrating a data recovery operation when one data drive per a small parity group fails according to the principles of the present invention.
Figure 10B:
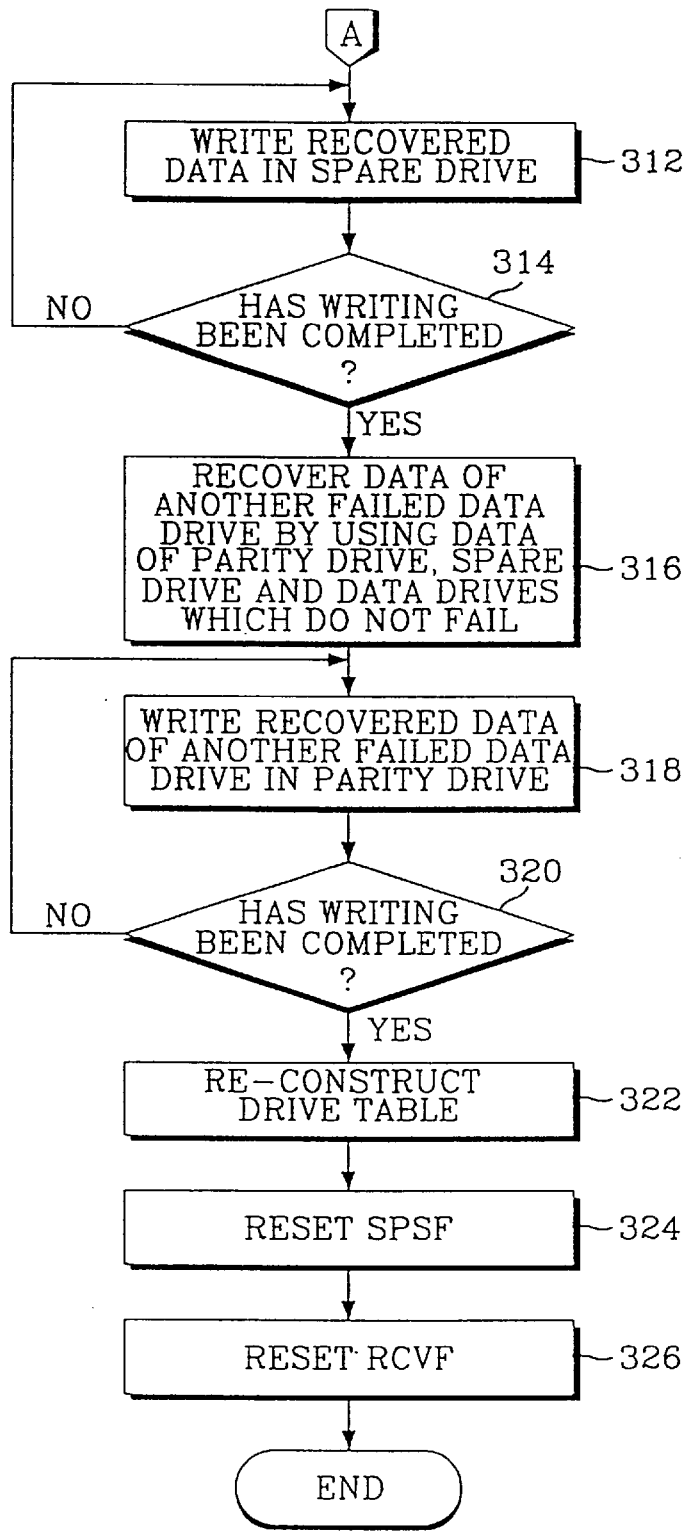

When one data drive per a small parity group fails, the data recovery operation is shown in FIGS. 10A and 10B. It is assumed that the data drive S1 within the first parity group 30 and the data drive S3 within the second parity group 40 fail.

If the data drives S1 and S3 fail, there is provided the spare drive SP so as to store data of the data drive S3. The data of the failed data drive S3 is recovered by using the drives S4 and PR which do not fail within the second parity group 40 and the spare drive SP. The recovered data of the failed data drive S3 is stored in the spare drive SP. The data of the failed data drive S1 is recovered by using the data drives S2 and S4, the parity drive PR and the spare drive SP which stores the recovered data of the data drive S3. The recovered data of the failed data drive S1 is stored in the parity drive PR.

In more detail, the disk array controller 4 detects the failed data drives S1 and S3 from each parity group at step 300 shown in FIG. 10A. At step 302, the disk array controller 4 sets the recovery flag RCVF. At step 304, the disk array controller 4 sets a replace parity flag RPPF. At step 306, the disk array controller 4 exchanges the lower block parity data LPR stored in the upper block 60A of the spare drive SP and the small group lower block parity data GLPR stored in the lower block 58B of the parity drive PR for each other. Therefore, the lower block parity data LPR is now stored in the lower block 58B of the parity drive PR, and the small group lower block parity data GLPR is now stored in the upper block 60A of the spare drive SP. At step 308, the disk array controller 4 resets the replace parity flag RPPF.

At step 310, the disk array controller 4 recovers the data of the failed data drive S3 within the second parity group 40 by using the data of the data drive S4, the parity drive PR and the spare drive SP. Namely, the upper block data of the failed data drive S3 is recovered by exclusively ORing the upper block data UBD of the data drive S4, the upper block parity data UPR of the parity drive PR and the small group upper block parity data GUPR stored in the lower block 60B of the spare drive SP. The lower block data of the failed data drive S3 is recovered by exclusively ORing the lower block data LBD of the data drive S4, the lower block parity data LPR of the parity drive PR and the small group lower block parity data GLPR stored in the upper block 60A of the spare drive SP. At step 312, the disk array controller 4 writes the recovered data, that is, the upper and lower block data of the failed data drive S3 in the spare drive SP. The disk array controller 4 checks, at step 314, whether writing has been completed.

If the writing has been completed, the disk array controller 4 recovers, at step 316, the data of the failed data drive S1 within the first parity group 30 by using the data of the parity drive PR, the data drives S2 and S4 and the spare drive SP which stores the recovered data of the failed data drive S3. That is, the upper block data of the failed data drive S1 is recovered by exclusively ORing the upper block data UBD of the data drives S2 and S4, the upper block parity data UPR of the parity drive PR and the recovered upper block data of the data drive S3 stored in the upper block 60A of the spare drive SP. The lower block data of the failed data drive S1 is recovered by exclusively ORing the lower block data LBD of the data drives S1 and S2, the lower block parity data LPR of the parity drive PR and the recovered lower block data of the data drive S3 stored in the lower block 60B of the spare drive SP.

The disk array controller 4 writes the recovered upper and lower block data of the failed data drive S1 in the parity drive PR at step 318. At step 320, whether writing has been completed is checked.

If the writing has been completed, the disk array controller 4 re-constructs the drive table. Namely, the drive table is re-constructed so as to replace the data drive S1 with the parity drive PR and to replace the data drive S3 with the spare drive SP. At step 324, the disk array controller 4 resets the split parity spare flag SPSF. At step 326, the disk array controller 4 resets the recovery flag RCVF. Since the split parity spare flag SPSF is reset, the parity check using the parity drive PR and the spare drive SP can no longer be implemented.

Figure 11:
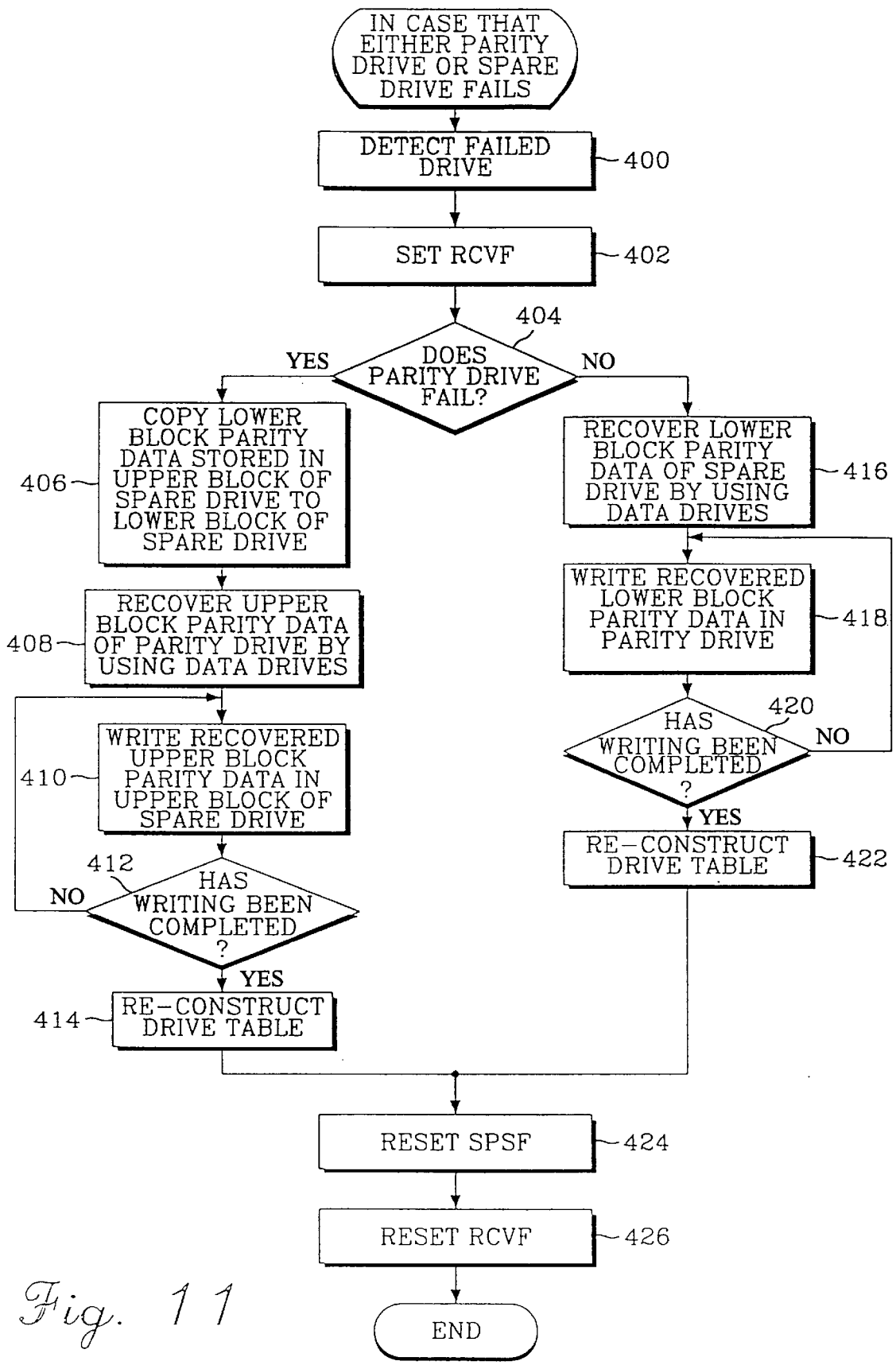
FIG. 11 is a flow chart illustrating a data recovery operation when either a parity drive or a spare drive fails according to the principles of the present invention.

When either the parity drive PR or the spare drive SP fails, the data recovery operation is shown in FIG. 11.

If the parity drive PR fails, since the lower block parity data LPR has been stored in the upper block 60A of the spare drive 60A, the upper block parity data UPR of the parity drive PR is recovered by using the upper block data UBD of the data drives S1, S2, S3 and S4. The recovered data is stored in the spare drive SP. If the spare drive SP fails, since only the lower block parity data LPR stored in the spare drive SP fails, the lower block parity data LPR is recovered by using the lower block data LBD of the data drives S1, S2, S3 and S4. The recovered data is stored in the parity drive PR.

In more detail, the disk array controller 4 detects the failed drive (that is, the parity drive PR or the spare drive SP) at step 400 shown in FIG. 11. At step 402, the disk array controller 4 sets the recovery flag RCVF. The disk array controller 4 checks, at step 404, whether the parity drive PR fails. If so, the disk array controller 4 copies, at step 406, the lower block parity data LPR stored in the upper block 60A of the spare drive SP to the lower block 60B thereof. At step 408, the disk array controller 4 recovers the upper block parity data UPR of the parity drive PR by exclusively ORing the upper block data UBD of the all the data drives S1, S2, S3 and S4 within the disk array 6. The recovered upper block parity data UPR is written in the upper block 60A of the spare drive SP at step 410. At step 412, whether writing has been completed is checked. If so, the disk array controller 4 re-constructs, at step 414, the drive table so as to replace the parity drive PR with the spare drive SP.

Meanwhile, if the spare drive SP fails at step 404, the disk array controller 4 recovers, at step 416, the lower block parity data LPR by exclusively ORing the lower block data LBD of the all the data drives S1, S2, S3 and S4 within the disk array 6. The recovered lower block parity data LPR is written in the lower block 58B of the parity drive PR at step 418. At step 420, whether writing has been completed is checked. If so, the disk array controller 4 re-constructs, at step 422, the drive table so as not to use the spare drive SP. At step 424, the split parity spare flag SPSF is reset, and at step 426, the recovery flag RCVF is reset.

Figure 12:
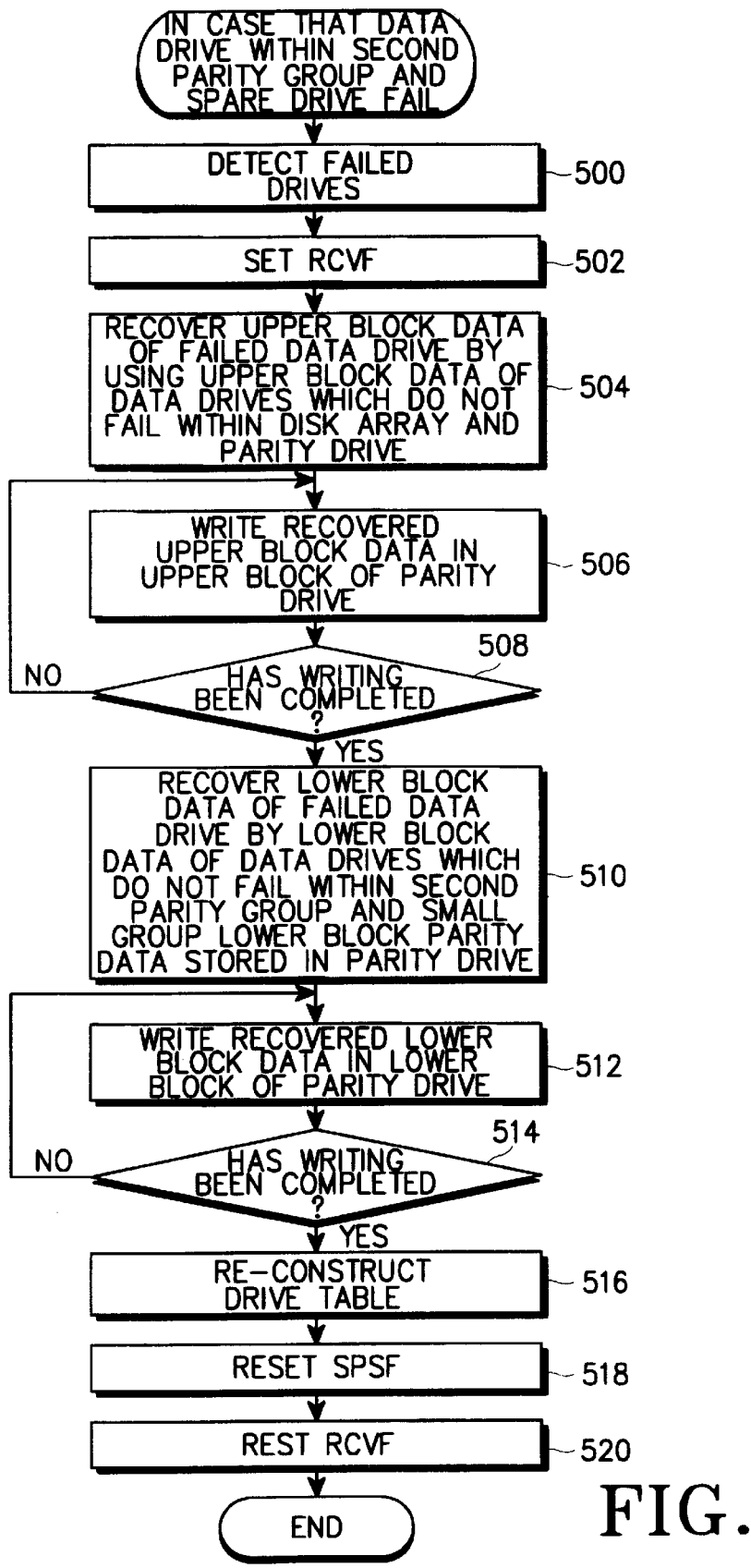
FIG. 12 is a flow chart illustrating a data recovery operation when one data drive within a second parity group and a spare drive fail according to the principles of the present invention.

When one data drive within the second parity group 40 and the spare drive SP fail, the data recovery operation is shown in FIG. 12. It is assumed that the data drive S3 within the second parity group 40 and the spare drive SP fail.

If the data drive S3 and the spare drive SP fail, the upper block data of the failed data drive S3 is recovered by using the upper block data UBD and UPR of the data drives S1, S2 and S4 and the parity drive PR. The recovered upper block data is stored in the upper block 58A of the parity drive PR. The lower block data of the failed data drive S3 is recovered by using the lower block data LBD of the data drive S4 and the small group lower block parity data GLPR stored in the lower block 58B of the parity drive PR. The recovered lower block data is stored in the lower block 58B of the parity drive PR.

In more detail, the disk array controller 4 detects the failed data drive S3 and the failed spare drive SP at step 500 shown in FIG. 12. At step 502, the disk array controller 4 sets the recovery flag RCVF.

At step 504, the disk array controller 4 recovers the upper block data of the failed data drive S3 by exclusively ORing the UBD and UPR of the data drives S1, S2 and S4 and the parity drive PR which do not fail within the disk array 6. At step 506, the recovered upper block data of the data drive S3 is written in the upper block 58A of the parity drive PR. At step 508, whether writing has been completed is checked.

If the writing has been completed, the disk array controller 4 recovers, at step 510, the lower block data of the failed data drive S3 by exclusively ORing the lower block data LBD of the data drive S4 which does not fail within the second parity group 40 with the small group lower block parity data GLPR stored in the lower block 58B of the parity drive PR. The recovered lower block data of the data drive S3 is written in the lower block 58B of the parity drive at step 512. The disk array controller 4 checks whether writing has been completed at step 514. If so, the disk array controller 4 re-constructs the drive table so as to replace the data drive S3 with the parity drive PR and so as not to use the spare drive SP. At step 518, the split parity spare flag SPSF is reset, and at step 520, the recovery flag RCVF is reset. Since the split parity spare flag SPSF is reset, the parity check using the parity drive PR and the spare drive SP can no longer be implemented.

As noted above, the inventive split parity spare disk achieving method has the following advantages. First, resources are efficiently managed since the spare disk is used even during the normal operation. Second, the work load of the parity disk drive is reduced and the entire performance of the system is improved by distributively storing the parity data of the parity disk drive. Third, it is possible to recover the data under predicable failed circumstances by dividing the data disk drive into the small parity groups and storing the parity result value in a unused region.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A split parity spare disk achieving method for improving the defect endurance and performance of a RAID (Redundant Arrays of Inexpensive Disks) subsystem which distributively stores data in a disk array consisting of a plurality of disk drives and carries out an input/output operation in parallel, said method comprising the steps of:

constructing said disk array with at least two data disk drives for storing data, a spare disk drive used when a disk drive fails and a parity disk drive for storing parity data; and splitting said parity data of said parity disk drive, and storing the split data in said parity disk drive and said spare disk drive.

2. The method as claimed in claim 1, wherein said disk array comprises four data disk drives, one parity disk drive and one spare disk drive.

3. A split parity spare disk achieving method for improving the defect endurance and performance of a RAID (Redundant Arrays of Inexpensive Disks) subsystem which distributively stores data in a disk array consisting of a parity disk drive, a spare disk drive and a plurality of data disk drives and carries out an input/output operation in parallel, said method comprising the steps of:

splitting parity data stored in said parity disk drive into upper block parity data and lower block parity data, and storing said upper block parity data in a upper block storage region of said parity disk drive and storing said lower block parity data in a upper block storage region of said spare disk drive;

defining the prescribed number of disk drives except said spare disk drive as small parity groups, and generating small group parity data by using disk drives of a small parity group which includes said parity disk drive; and splitting said small group parity data into small group upper block parity data and small group lower block parity data, and storing said small group upper block parity data in a lower block storage region of said spare disk drive and storing said small group lower block parity data in a lower block storage region of said parity disk drive.

4. The method as claimed in claim 3, wherein said small parity group comprises:

a first parity group consisting of a plurality of data disk drives which does not include said parity disk drive; and a second parity group consisting of a plurality of data disk drives and including said parity disk drive.

5. The method as claimed in claim 4, wherein each of said disk drives are divided into an upper block storage region and a lower block storage region on the basis of an intermediate cylinder value of each disk drive.

6. The method as set forth in claim 5, further comprising the steps of:

detecting a failed drive;

determining whether said failed drive is any one or more of said data disk drives, said parity disk drive or said spare disk drive.

7. The method as claimed in claim 6, further comprising the steps of:

copying the lower block parity data stored in the upper block storage region of said spare drive to the lower block storage region of said parity drive when it is determined that one of said data disk drives failed;

recovering the upper and lower block data of said failed data disk drive by exclusively ORing the upper and lower block data of the data disk drives of said disk array which did not fail with the upper and lower block parity data, respectively; and writing the recovered upper and lower block data in the upper and lower block storage regions of said spare disk drive.

8. The method as set forth in claim 6, further comprising the steps of:

exchanging the lower block parity data stored in the upper block storage region of said spare disk drive and the small group lower block parity data stored in the lower block storage region of said parity disk drive for each other, when it is determined that one of said data disk drives in each of said first and second parity groups failed;

recovering the upper and lower block data of the failed data disk drive within said second parity group by exclusively ORing the upper and lower block data of the data disk drive which did not fail within said second parity group, the upper and lower block data of said parity disk drive and the upper and lower block data of said spare disk drive;

writing the recovered upper and lower block data in the upper and lower block storage regions of said spare disk drive;

recovering the upper and lower block data of the failed data disk drive in said first parity group by exclusively ORing the upper and lower block data of each of the data disk drives which did not fail, the upper and lower block data of said parity disk drive and said recovered upper and lower block data stored in the upper and lower block storage regions of said spare disk drive; and writing the recovered upper and lower block data of the failed data disk drive which is in said first parity group in the upper and lower block storage regions of said parity disk drive.

9. The method as set forth in claim 6, further comprising the steps of:

copying the lower block parity data stored in the upper block storage region of said spare disk drive to the lower block storage region of said spare disk drive, when it is determined that said parity disk drive failed;

recovering the upper block parity data of said parity drive by exclusively ORing the upper block data of each of said data disk drives; and writing the recovered upper block parity data into the upper block storage region of said spare disk drive.

10. The method as set forth in claim 6, further comprising the steps of:

recovering the lower block parity data stored in the upper block storage region of said spare disk drive by exclusively ORing the lower block data of each of said data disk drives, when it is determined that said spare disk drive failed; and writing the recovered the lower block parity data into the lower block storage region of said parity disk drive.

* * * * *